United States Patent
Linkies et al.

(10) Patent No.: US 10,236,577 B2
(45) Date of Patent: Mar. 19, 2019

(54) ANTENNA WITH A LENS

(71) Applicant: KROHNE Messtechnik GmbH, Duisburg (DE)

(72) Inventors: Mathias Linkies, Mülheim (DE); Almir Adrovic, Duisburg (DE)

(73) Assignee: KROHNE MESSTECHNIK GMBH, Duisburg (DE)

(*) Notice: Subject to any disclaimer, the term of this patent is extended or adjusted under 35 U.S.C. 154(b) by 143 days.

(21) Appl. No.: 15/260,505

(22) Filed: Sep. 9, 2016

(65) Prior Publication Data

US 2017/0077601 A1    Mar. 16, 2017

(30) Foreign Application Priority Data

Sep. 11, 2015  (DE) .......................... 10 2015 115 395

(51) Int. Cl.
*H01Q 19/06* (2006.01)
*H01Q 3/46* (2006.01)
*G01S 7/02* (2006.01)
*G01F 23/284* (2006.01)
*H01Q 15/02* (2006.01)
(Continued)

(52) U.S. Cl.
CPC ............. *H01Q 3/46* (2013.01); *G01F 23/284* (2013.01); *G01S 7/02* (2013.01); *G01S 13/88* (2013.01); *G02B 23/2423* (2013.01); *G02B 27/0006* (2013.01); *H01Q 1/225* (2013.01); *H01Q 1/50* (2013.01); *H01Q 1/526* (2013.01);
(Continued)

(58) Field of Classification Search
CPC ............. H01Q 3/46; H01Q 1/50; H01Q 1/526
See application file for complete search history.

(56) References Cited

U.S. PATENT DOCUMENTS 6,023,246 A * 2/2000 Tanabe ................... H01Q 19/08
                                                      343/753
6,658,932 B2   12/2003 Munley et al.
(Continued)

FOREIGN PATENT DOCUMENTS

DE   10 2014 101 410 A1   8/2015
DE   20 2015 105 362 U1   12/2015

OTHER PUBLICATIONS

Nils Pohl and Michael Gerding, A Dielectric Lens-Based Antenna Concept for High-Precision Industrial Radar Measurmeents at 24GHz, Proceedings of the 42nd European Microwave Conference, Oct. 29-Nov. 1, 2012, p. 731-734, Amsterdam, The Netherlands.

*Primary Examiner* — Dieu Hien T Duong
(74) *Attorney, Agent, or Firm* — David S. Safran; Roberts Mlotkowski Safran Cole & Calderon, P.C.

(57) ABSTRACT

An antenna for a level meter and a method for operating such an antenna. The antenna has an antenna housing, at least one supply element and at least one lens, the lens having at least first and second lens surfaces. The supply element guides coupled electromagnetic radiation and emits electromagnetic radiation in the direction of the first lens surface. The electromagnetic radiation received via the first lens surface can be relayed and emitted via the second lens surface. The lens is formed at least in part of a porous material, wherein the porous material connects the first lens surface and the second lens surface to one another, and a flushing device is provided for impinging the lens with a medium that passes through the porous material and through the second lens surface via the first lens surface.

17 Claims, 4 Drawing Sheets

(51) Int. Cl.

| | | |
|---|---|---|
| *G01S 13/88* | (2006.01) | |
| *H01Q 1/22* | (2006.01) | |
| *G02B 27/00* | (2006.01) | |
| *H01Q 1/50* | (2006.01) | |
| *H01Q 1/52* | (2006.01) | |
| *G02B 23/24* | (2006.01) | |
| *H01Q 17/00* | (2006.01) | |

(52) U.S. Cl.
CPC ........... *H01Q 15/02* (2013.01); *H01Q 19/062* (2013.01); *H01Q 17/00* (2013.01)

(56) References Cited

U.S. PATENT DOCUMENTS

| | | |
|---|---|---|
| 7,515,095 B2 | 4/2009 | Wilkie et al. |
| 8,917,215 B2 | 12/2014 | Pohl |
| 9,091,584 B2 | 7/2015 | Vogt et al. |
| 9,417,122 B2 | 8/2016 | Adam |
| 2002/0174685 A1* | 11/2002 | Nonogaki ............. H01Q 15/08 65/37 |
| 2010/0066594 A1* | 3/2010 | Kienzle ................ G01F 23/284 342/175 |

\* cited by examiner

ANTENNA WITH A LENS

BACKGROUND OF THE INVENTION

Field of the Invention

The invention relates to an antenna for a level meter with an antenna housing, with at least one supply element and with at least one lens, wherein the lens has at least a first lens surface and a second lens surface, wherein the supply element is used for guiding coupled electromagnetic radiation and radiating electromagnetic radiation in the direction of the first lens surface, wherein, with the lens, the electromagnetic radiation received via the first lens surface can be relayed and can be emitted via the second lens surface on the process side.

Description of Related Art

The antennae being discussed here are used, for example, in level meters employing the radar principle, wherein, in addition to the antenna, the level meters comprise an electronic transmitting and evaluating unit. Electromagnetic waves are generated by the electronic transmitting and evaluating unit and led over a suitable transmission path to the antenna. The antenna itself can be implemented in various manners. For example, it can be a dielectric antenna or a horn radiator; the antenna can also be implemented as a combination of various antenna technologies. Presently, the exact type of antenna is not of importance. However, it is relevant that the antenna comprises a lens.

Often, such antennae are used in difficult measuring environments, for example, in silos or other containers that may, for example, be filled with a dusty medium. Such antennae are also used in the food industry and the pharmaceutical industry. It is possible that the lens of the antenna comes into contact with the medium. Use in difficult measurement environments leads to dust or a condensate adhering to the antenna lens and building up, thus contaminating the lens. This then interferes with the measurement signal culminating in an impossibility of use for further measurements. Cleaning the antenna or antenna lens is then necessary in order to guarantee a proper functioning of the antenna, for example, to guarantee the necessary accuracy of a level measurement.

It is known from the prior art to flush, to cool or to heat antennae so that a flushing line for a flushing medium is led through the process flange or the process tank and, sometimes quite complexly, led to the antenna. Such a flushing device is used, for example, in the radar level meters "BM 70 A" and BM 70 P" of the applicant.

In general, the antenna lens is made of a plastic, for example, PEEK (polyetheretherketone). It can be a problem in lenses known from the prior art that use under extreme conditions, such as a very high or a very low temperature or at high pressures, is afflicted with disadvantages. Operating under high pressures creates tension in the lens, which can lead to an altered transmitting characteristic of the lens or to destruction of the lens.

Due to their material, plastic lenses have a low yield strength, which sinks further at an increase in temperature. This results in that they are not durable under high pressure, thus, are not suitable for use in extreme conditions.

SUMMARY OF THE INVENTION

The object of the invention is to provide an antenna of the type mentioned above in which the disadvantages known from the prior art are eliminated—at least for the most part.

This object is initially and essentially achieved in that the lens is formed at least in part of a porous material, wherein the porous material connects the first lens surface and the second lens surface to one another, and that a flushing device is provided, which can be used for impinging the lens with a medium such that the medium passes through the porous material and through the second lens surface via the first lens surface.

When discussing porous material, it is meant that the material has, at least partially, preferably completely, an open porosity, i.e., the material has hollow spaces in contact with one another and with its environment, i.e., with the areas adjacent to the first lens surface and the second lens surface. It is thereby achieved that the lens is permeable for certain media. The limiting size for the permeability, here, is the size of the hollow spaces in the porous material, or respectively the size of particles possibly contained in the medium.

As opposed to the prior art, the antenna according to the invention has, in particular, the advantage that flushing of the lens with the medium is not implemented by flushing the second lens surface from the outside—i.e., using a process-side rinsing—but rather that a flushing device is used for impinging the lens with the medium such that the medium passes through the porous area of the lens through the second, process-side lens surface via the first lens surface facing the inside of the antenna housing, a flushing of the lens thus occurs in that the medium—flushing medium—passes through the lens. In other words, a flushing of the lens—at least in part—takes place in the direction of radiation.

Furthermore, it has been seen that the antenna according to the invention is particularly suitable for use in areas having a high pressure. The lens normally closes off the process space with its second lens surface—wherein the process space is to be understood broadly as the space, in which the electromagnetic radiation can be emitted via the second lens surface—i.e., is always subject to the pressure prevailing on the process space. Since the lens is formed at least partially of a porous material, pressure compensation between an area adjacent to the first lens surface and the process space adjacent to the second lens surface is possible. This achieves that the lens itself is relieved of pressure.

Since the lens of the antenna according to the invention can no longer implement the pressure closure to the process space, it is necessary that the antenna, or respectively, antenna housing has a pressure closure relative to the process space at another place so that a functional space adjacent to the antenna or antenna housing is closed pressure tight with respect to the process space. The functional space is to be understood broadly as the space in which the electronic components and a possible transmitter of the measuring device, in which the antenna is installed, are located. For example, the pressure closure can be implemented by welding or with a suitable seal.

Different materials can be used for the porous area of the lens. A preferred design is wherein the porous material is polypropylene (PP), ultra high molecular weight polyethylene (UHMW-PE) or polytetrafluoroethylene (PTFE). The antenna according to the invention, however, is not limited to the use of one of the three mentioned materials.

The criterion for a suitable material is that the material has an at least partially open porosity. Materials that have only a closed porosity, namely such porosity in which the hollow spaces are not in contact with one another, are thus not suitable. An open porosity is achieved, for example, using a suitable sintering, i.e., the "baking" of a granular or powder starting material, wherein the sintering process has to be finalized at the right time in order to retain the required porosity in a sufficient measure. It can be seen here that a ceramic or metallic design of the porous material can also be implemented.

The geometry of the lens as such is not of importance for the present invention. The invention can, for example, be implemented with a "commonly formed" lens, or however, with an ellipsoid lens, such as one known from U.S. Pat. No. 8,917,215 B2 which is hereby incorporated by reference.

The flushing device can be implemented in various manners. The flushing device can be implemented by a line adjacent to the lens—for example, in the form of a silicone tube. The flushing device has to then be attached to a "flushing medium source" so that flushing can ensue. However, it is then only substantial for the invention that a flushing device is present that fundamentally makes the desired flushing possible.

A particularly preferred design of the antenna according to the invention is wherein the flushing device comprises a chamber formed in the antenna housing, wherein the chamber is limited at least in part by the lens, the chamber is adjacent to the supply element and wherein the chamber can be impinged with medium, in particular can be impinged with a medium through a supply line leading through a chamber wall of the chamber and/or through the antenna housing.

When it is said that the chamber is adjacent to the supply element, this can, for example, be implemented in that the chamber is arranged between the supply element and the lens, wherein the chamber is open toward the lens—or in the area of the lens—i.e., the lens limits the chamber. In "adjacent", it is understood that the supply element can at least partially extend in to the chamber. If the lens is designed to be ellipsoid, then the supply element can also pass through the entire chamber or the chamber can be implemented as a "ring chamber" around the supply element.

The chamber can be designed in various manners. In one implementation of the chamber, it is provided that the chamber has separate chamber walls, the chamber then forming its own, closed space independent of the antenna housing.

Another design of the chamber is wherein the chamber is partially formed by the antenna housing, i.e., the antenna housing partially implements the chamber walls.

In the operating state of the antenna, the radiation coupled into the supply element and guided by the supply element is emitted by the supply element in the direction of the first lens surface. If the antenna has a chamber, the electromagnetic radiation is initially emitted into the chamber. The electromagnetic radiation passes through the chamber, the lens receives the radiation via its first lens surface, guides it further and emits it into the process space via the second lens surface. In order to avoid reflection of the electromagnetic radiation on the walls of the chamber; which leads to interference of the measurement signal of interest for the actual measurement, the signal being continuous without reflection; a particular implementation of the antenna according to the invention is wherein the chamber is lined with a material that absorbs electromagnetic radiation or consists of a material that absorbs electromagnetic radiation. A material that absorbs electromagnetic radiation, for example, is a plastic with carbon or a plastic with metal particles. A lining, for example, can be implemented in that the chamber is coated or vaporized with a suitable material.

The chamber can be impinged with a medium, in particular, the chamber can be impinged with the medium from a line led through a chamber wall and/or the antenna housing. Due to the at least partial porosity of the lens, the medium escapes through the porous areas of the lens out of the chamber. This is what achieves the flushing of the lens.

The lens of the antenna according to the invention is heated or cooled—depending on the temperature of the medium—in a very simple manner using a temperature compensation between the lens and the medium flowing through the porous areas of the lens. Since the temperature of the lens can be set independently of the temperature of the measuring environment, use of the antenna according to the invention is also possible under very hot or very cold measurement conditions by suitable choice of the temperature of the medium. Tension in the material caused by temperature differences can be avoided by using a uniform temperature conditioning of the lens.

The lens is cleared of collected deposits, which are washed away by the medium, on the second lens surface by the flushing effect.

In a particular design of the antenna according to the invention, the chamber is designed such that it can be impinged with the medium so that excess pressure in the chamber is created. The medium escapes from the chamber under a higher pressure. This allows for strongly-adhering deposits to be removed.

The medium should be chosen so that it is not deposited in the porous material in order to avoid clogging of the hollow spaces. In particular, a gaseous medium or a liquid medium, in particular a liquid medium with a high fluidity, is suitable.

In a preferred design of the antenna according to the invention, the medium is supplied from outside of the antenna housing. In a further design, a medium chamber is provided within the antenna housing, from which the medium is supplied to the chamber.

If the chamber is implemented as a separate chamber, i.e., independent of the antenna housing, the medium can be supplied from outside of the antenna housing via the supply line in one design of the antenna. Then, the supply line is led through the chamber wall as well as through the antenna housing. The supply line can be implemented as a separate component, such as a hose or a tube, for example. Then, it should be taken care that a functional seal is implemented so that the medium does not leak from the supply line in an undesired manner. In a further design, the supply line is implemented as a recess in the chamber wall and the outer wall, for example through a bore hole. It is also possible to have a design, in which the part of the supply line led through the chamber wall is implemented as a separate component and the part of the supply line leading through the antenna housing is implemented as a recess, or vice versa.

In a further design, in which the chamber is implemented as a separate chamber, it is provided that a medium from a medium tank also arranged in the antenna housing is supplied to the chamber. The supply line is then only led through the chamber wall, but not through the antenna housing. If the medium tank is directly adjacent to the chamber, an implementation of the supply line as recesses in the chamber wall and the medium tank wall is possible.

If the medium tank is not arranged directly adjacent to the chamber, then a supply line is recommended that is implemented as a separate component. The choice of component—for example tube or hose—and, in particular the choice of the material of the component—for example silicone, plastic or stainless steel—is always dependent on the medium and must satisfy the requirements of the medium to be supplied. A medium with a high temperature requires a supply line that is resistant to high temperatures. A medium with a low temperature requires a supply line that is resistant to low temperatures. When supplying compressed air, the supply line must be pressure resistant. In the ideal case, such a material is used that satisfies all requirements, so that the choice of media that can be supplied is not limited by the supply line.

It is necessary to create a possibility for the medium tank to continually fill itself with medium. On the one hand, it is possible that the medium tank itself can be exchanged, then the antenna housing needs to be able to be accordingly opened. It also possible to have a design in which the medium tank is filled itself. This can take place, for example, using a supply line to the medium tank, wherein the supply line then has to lead out of the antenna housing.

If the chamber is implemented as part of the antenna housing, i.e., if the chamber walls are implemented at least in part by the antenna housing, then the supply line is led only through the antenna housing. In this design, an implementation of the supply line as a separate component or, however, as a recess in the antenna housing is also possible.

If the antenna according to the invention is wherein the lens consists at least partially of a porous material, wherein the porous material connects the first lens surface and the second lens surface, then this can be implemented in various manners.

A particularly preferred design of the antenna according to the invention is wherein the lens consists completely of porous material in the area between the first lens surface and the second lens surface. Thus, the lens is wherein the entire effective usable surface of the lens, i.e., the surface through which the electromagnetic radiation is relayed in the operating state of the antenna and emitted via the second lens surface, consists of porous material. The preferred design has the advantage that the entire effective usable lens surface is permeable for a medium. This goes hand in hand with further advantages: a complete and uniform heating or cooling of the lens, a flushing over the entire effective usable surface, leading to a cleansing of collected deposits from the entire second lens surface.

The entire lens can be formed of porous material, i.e., also the areas that are not located in the radiation path of the electromagnetic radiation, for example, the areas in which the lens is in contact with the housing.

A further, particularly preferred design of the antenna according to the invention is wherein the lens has channels of porous material. The rest of the lens is made of a non-porous material and is not permeable for a medium. A cooling or heating of the lens using a warm or cold medium is, thus, initially carried out locally in the area of the porous channels.

The arrangement of the channels over the cross-section of the lens is arbitrary. An arrangement is particularly preferred in which the channels are arranged in a uniform distribution over the lens surface.

The cross-section and the diameter of the channels can be arbitrarily chosen.

In a preferred design, the channels are arranged perpendicular to the lens surface. A further preferred design is wherein the channels are arranged at an angle to the lens surface differing from the surface normal. A further design is wherein both channels arranged perpendicular to the lens surface as well as channels at an angle to the lens surface differing from the angle of the surface normal are provided.

There are various possibilities for implementing the channels of porous material in the lens. On design provides that the porous material is sintered in the lens. Preferably, the lens then has channels in the form of bore holes, into which the material is sintered.

A further design provides for inserted plugs of porous material into recesses existing in the lens. An advantage of this design is that the plugs can be exchanged. Thus, for example, if the porous material becomes clogged, it can be easily exchanged without having to replace the entire lens. The plugs have to be attached to the lens so that they do not become loose or even fall out during operation of the antenna. Thus, an attachment needs to be implemented so that no impairment of the propagation of the electromagnetic radiation is registered. Accordingly, it is recommended to adapt the plug material to the lens material, ideally both materials have a refractive index corresponding as close as possible to one another.

If the lens has channels of a porous material and the channels, for example, are arranged in a ring shape around a lens center, then the preferred flushing device can be implemented in the form of a ring chamber. The chamber is then adjacent to only a part of the lens, in which the porous channels are located. The chamber itself can be impinged with a medium through a supply line. Furthermore, the flushing device can be implemented by a line connected to the porous channels.

A further preferred design of an antenna according to the invention is wherein the lens has a porous cover layer, wherein the cover layer is provided on the side of the lens facing away from the supply element.

Furthermore, the invention relates to a method for operating the antenna according to the invention as described above. The method is based on an antenna with an antenna housing, with at least one supply element and with at least one lens, wherein the lens has at least a first lens surface and a second lens surface, wherein the supply element is used for guiding coupled electromagnetic radiation and radiating electromagnetic radiation in the direction of the first lens surface, wherein, with the lens, the electromagnetic radiation received via the first lens surface can be relayed and can be radiated via the second lens surface, wherein the lens consists, at least in part, of a porous material, wherein the porous material connects the first lens surface and the second lens surface to one another, and wherein a flushing device is comprised. It is provided according to the invention, here, that the lens is impinged with a medium via the flushing device such that the medium passes through the porous material and through the second lens surface via the first lens surface, so that flushing occurs.

A particular implementation of the method according to the invention is wherein the impinging of the chamber with the medium is continuously carried out. The lens is thus supplied with medium without any time interruption, so that there is a continuous flow through the porous material of the lens. A continuous impinging of the lens with medium goes hand in hand with a continuous flushing. Thus, the possibility that deposits collect on the lens sinks. Furthermore, a continuous flushing guarantees—assuming that the temperature of the medium used for flushing remains the same—that the lens has a stable temperature.

A further implementation of the method according to the invention is wherein the impinging of the lens with the medium is carried out in a predetermined time interval $\Delta t_1$. This implementation has the advantage that the flushing medium can be used sparsely and flushing only occurs when it is necessary, i.e., when the lens, for example, has been acutely contaminated with deposits.

A preferred implementation of the method according to the invention is wherein the impinging of the lens with the medium is carried out with excess pressure, in particular with excess pressure during a predetermined time interval $\Delta t_2$. If the lens is such impinged under excess pressure, the medium is made to flow through the porous material of the lens at a higher pressure. This allows for strongly-adhering contaminations on the lens to be removed.

A further implementation of the method according to the invention is wherein the medium is brought to a medium temperature $T_1$ before the lens is impinged with the medium. This allows for the lens to be set at an arbitrary temperature—naturally in the scope of possibilities of the medium to take on such temperatures. Furthermore, the implementation of the method allows for the temperature of the lens to be changed during flushing, namely in that the temperature of the medium is changed before it is guided to the lens.

In detail, there are various possibilities for designing and further developing the antenna according to the invention and the method according to the invention for operating an antenna as will be apparent from the following description of preferred embodiments in conjunction with the drawings.

DETAILED DESCRIPTION OF THE INVENTION

Figure 1:
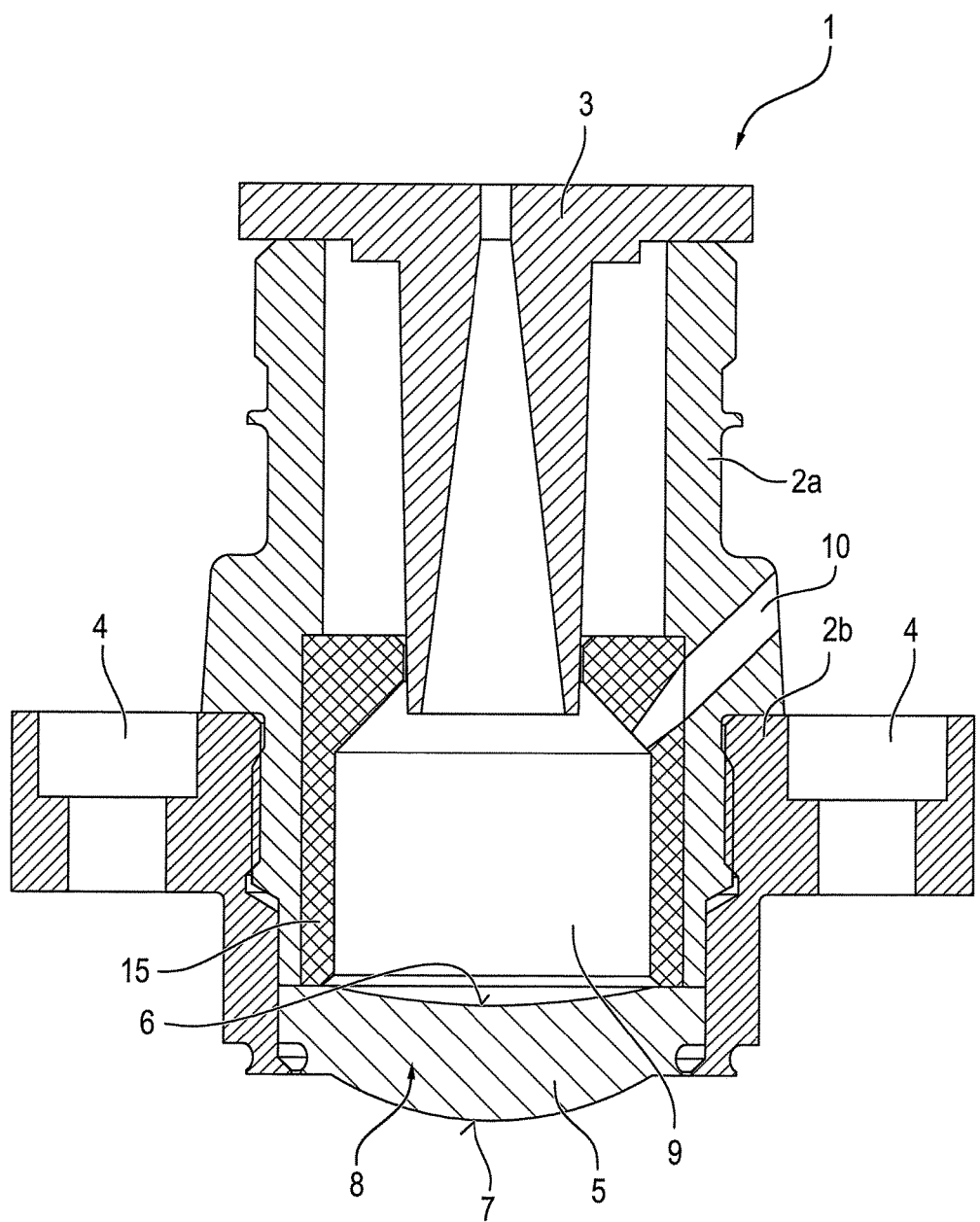
FIG. 1 is a cross-sectional view of a first embodiment of the antenna according to the invention.

FIG. 1 shows an antenna 1 according to the invention. The antenna 1 comprises an antenna housing 2, wherein the antenna housing 2 in the shown embodiment formed of two parts 2a and 2b. The first part 2a of the housing accommodates a supply element 3 and is screwed into the second part 2b. For this, the first part 2a of the housing 2 has a threading and the second part 2b of the housing 2 has a corresponding counter-threading. The second part 2b of the housing 2 has bore holes 4 for attaching the antenna 1. The antenna 1 also comprises a lens 5. In the illustrated embodiment, the lens 5 is held in the second housing part 2b and is fixed with the first housing part 2a, in that the first housing part 2a is screwed into the second housing part 2b.

The lens 5 has a first lens surface 6 and a second lens surface 7. The lens shown in FIG. 1 is formed completely of a porous material 8, which connects the first lens surface 6 and the second lens surface 7 to one another. Furthermore, the antenna housing 2 comprises a flushing device in the form of a chamber 9. The chamber 9 is partially limited by the lens 5 and is additionally adjacent to the supply element 3. The wall of the chamber 9 shown in FIG. 1 is formed partially of radiation-absorbing material 15. Reflections of the radiation on the chamber walls and interferences of the radiation propagation caused thereby, for example, due to interfering occurrences, are prevented by the radiation-absorbing material 15.

Furthermore, a supply line 10 that leads to the chamber 9 is implemented. The supply line 10 is implemented by recesses in a chamber wall of the chamber 9 and the first part 2a of the antenna housing 2. The chamber 9 can be impinged with a medium through the supply line 10. The medium escapes through the areas of porous material 8 of the lens 5. Flushing is thereby achieved and deposits adhering to the second lens surface 7 are washed away. In accordance with the temperature of the medium, with which the chamber 9 is impinged, a cooling or warming of the lens 5 occurs. The chamber 9 can be impinged with a medium so that an excess pressure prevails in the chamber 9, which makes it possible to wash away strongly-adhering contaminations on the second lens surface 7.

Since the lens is made at least partially of a porous material, pressure compensation between an area adjacent to the first lens surface and the process space adjacent to the second lens surface is possible. This achieves that the lens itself is relieved of pressure. It is necessary to provide a pressure seal for the functional space—not shown—adjacent to the supply element 3, for example, with a seal.

Figure 2:
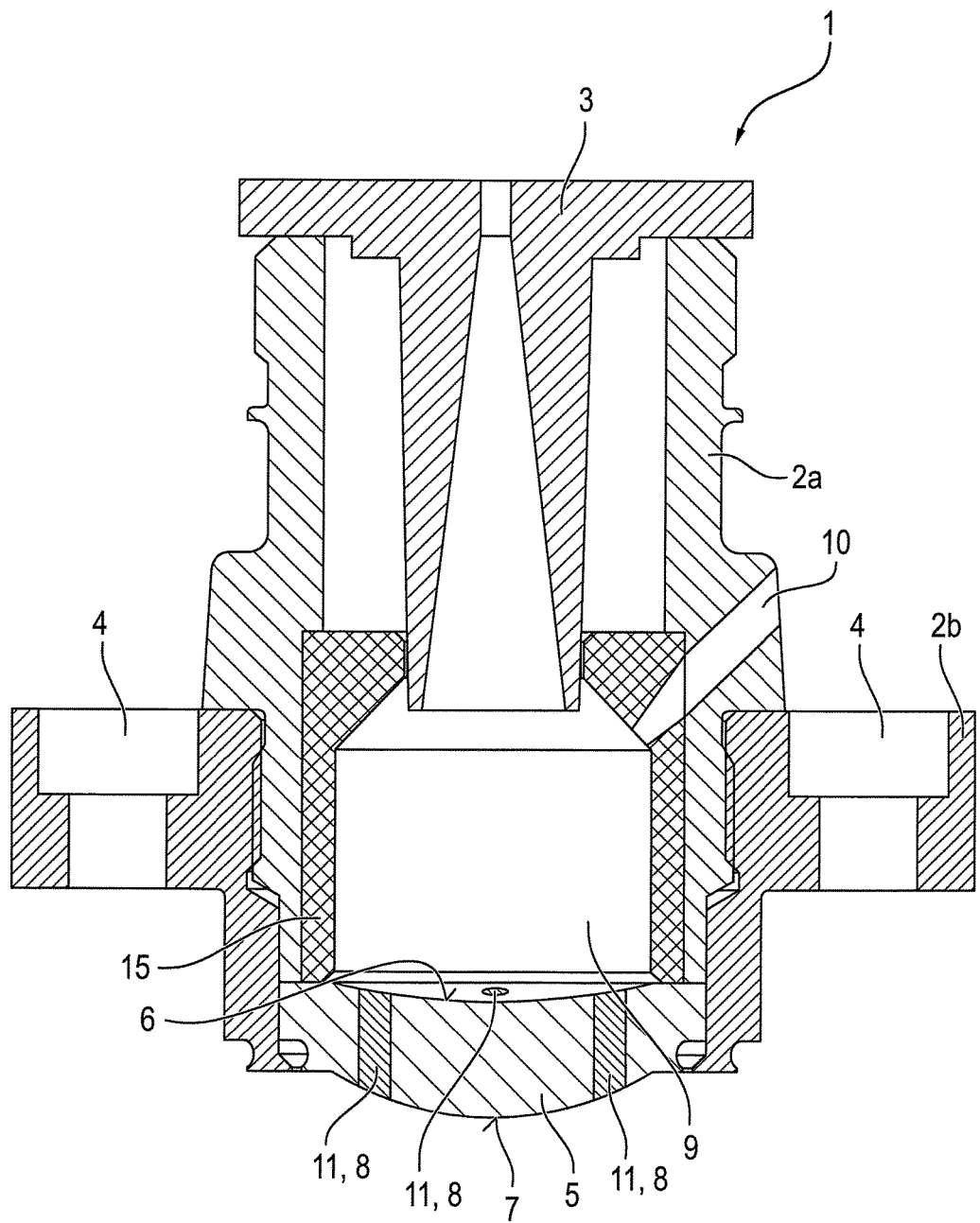
FIG. 2 is a cross-sectional view of a second embodiment of the antenna according to the invention.

An embodiment of an antenna according to the invention is shown in FIG. 2, in which the lens 5 has channels 11 of porous material 8. The rest of the lens 5 is made of non-porous material. In order to avoid interferences in the propagation of the electromagnetic radiation, the lens 5 and the porous channels 11 are made of materials having the same refractive index. The channels 11 are arranged periodically and symmetrically to one another around a lens center point and have a round cross-section. The channels 11 run essentially perpendicular to the first lens surface 6 and to the second lens surface 7, essentially because the lens surfaces 6, 7 have a curvature. Here, the channels 11 run in the main direction of radiation of the antenna 1.

Figure 3:
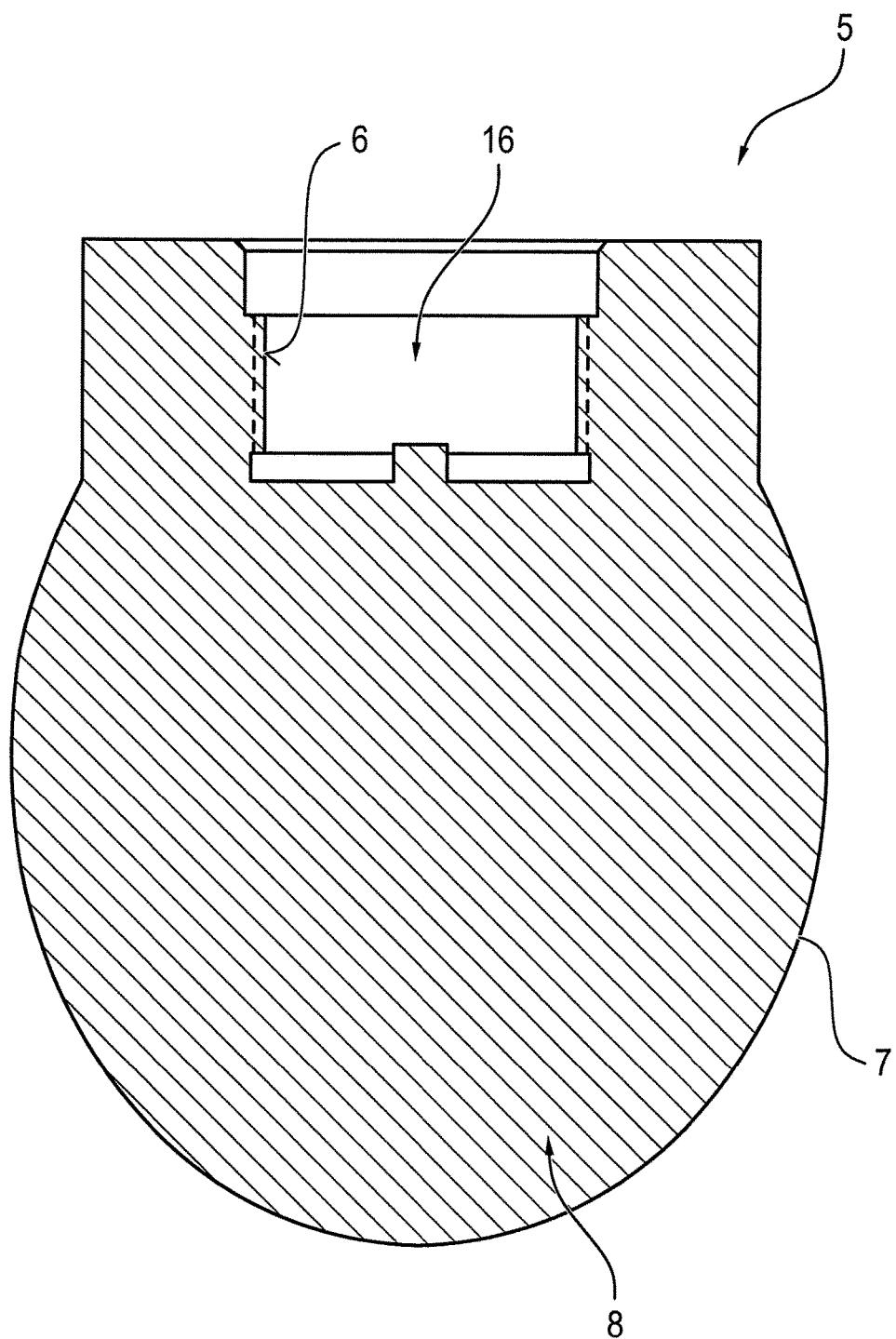
FIG. 3 is a cross-sectional view of an embodiment of a lens of the antenna according to the invention.

An embodiment of another lens 5' for the antenna according to the invention is shown in FIG. 3. The lens 5' is implemented as an ellipsoid lens. The lens 5' has a first lens surface 6 and a second lens surface 7, wherein, in the operating state, the lens 5' receives electromagnetic radiation from a—not shown—supply element via the first lens surface 6 and emits it via the second lens surface 7 on the process side. In order to accommodate the supply element, the lens 5' has a recess 16. The lens 5' is formed completely of porous material 8. In this case, the supply element 10 can pass through the entire chamber or the chamber can be implemented as a "ring chamber" around the supply element.

Figure 4A:
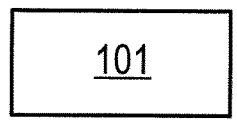
FIGS. 4a-4d are block diagrams of a method according to the invention.

Block diagrams of embodiments of the method according to the invention are shown in FIGS. 4a)-4d) for operating an antenna as is known from FIG. 1, having an antenna housing, with at least one supply element 3 and with at least one lens 5, 5' wherein the lens 5, 5' has at least a first lens surface 6 and a second lens surface 7, wherein the supply element 3 is used for guiding coupled electromagnetic radiation and radiating electromagnetic radiation in the direction of the first lens surface 6, wherein, with the lens 5, the electromagnetic radiation received via the first lens surface 6 can be relayed and can be emitted via the second lens surface 7, wherein the lens 5, 5' is formed, at least in part, of a porous material 8, wherein the porous material 8 connects the first lens surface 6 and the second lens surface 7 to one another, and wherein a flushing device is also provided. The lens 5, 5' is impinged with a medium via the flushing device in method step 101 such that the medium passes through the porous material 8 and through the second lens surface 7 via the first lens surface 6 (FIG. 4a).

Figure 4B:
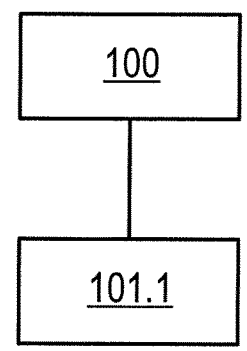

In the embodiments shown in FIGS. 4b) to 4d), the medium is brought to a medium temperature $T_1$ in a first method step 100. Then, the lens is impinged with a medium via the flushing device so that the medium passes through the porous material of the lens through the second lens surface via the first lens surface so that flushing occurs.

In the embodiment according to FIG. 4b), impinging of the lens with the medium is carried out continuously (method step 101.1. A continuous flushing is caused by a continuous impingement of the lens. This achieves that deposits adhering to the second lens surface are washed away, i.e., the lens surface is cleansed. Due to the continuous flushing, further deposits are not able to become adhered, at least this is strongly limited. Due to the prior temperature conditioning of the medium, the lens is brought to the medium temperature $T_1$ by the flushing.

Figure 4C:
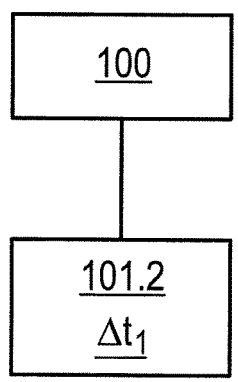

The method shown schematically in FIG. 4c) differs from the method shown in FIG. 4b) in that the impinging of the lens takes place over a time interval $\Delta t_1$ in a second method step 101.2, in which the lens is impinged with a medium via the flushing device such that the medium passes through the first lens surface, through the porous material of the lens, through the second lens surface, so that flushing occurs. Flushing is accordingly not continuous, but is carried out during the time interval $\Delta t_1$. This embodiment is then advisable when the lens—the second lens surface—needs to be cleansed, but when continuous flushing is not necessary.

Figure 4D:
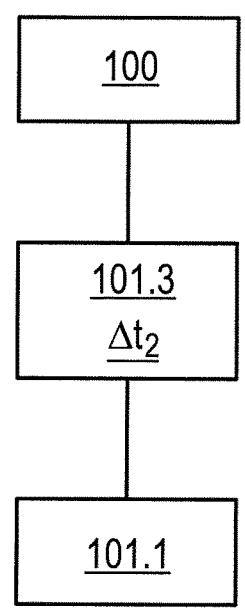

The method shown schematically in FIG. 4d) is wherein the lens is impinged with the medium having an excess pressure in a second method step 101.3. Impinging with excess pressure is carried out over a time interval $\Delta t_2$. Due to the impinging of the lens with excess pressure, in particular strongly-adhering contaminations can be removed from the second lens surface. The time interval $\Delta t_2$ is preferably chosen so that the strongly-adhering contaminations are completely removed. In a further method step 101.1, the lens is further continuously impinged with the medium, however without excess pressure, whereby a repeated adhering of the deposits is avoided.

What is claimed is:

1. Antenna for a level meter with an antenna housing, comprising:
    at least one lens, wherein the lens has at least a first lens surface and a second lens surface, and
    at least one supply element for guiding coupled electromagnetic radiation and emitting electromagnetic radiation to the first lens surface for emission via the second lens surface,
    wherein the lens is formed at least in part of a porous material that connects the first lens surface and the second lens surface to one another, and
    wherein a flushing device is provided for impinging the lens with a medium such that the medium passes through the porous material and through the second lens surface from the first lens surface.

2. Antenna according to claim 1, wherein the porous material is material selected from the group consisting of polypropylene (PP), ultra high molecular weight polyethylene (UHMW-PE) and polytetrafluoroethylene (PTFE).

3. Antenna according to claim 1, wherein that the flushing device comprises a chamber formed in the antenna housing, wherein the chamber is bounded at least in part by the lens, wherein the chamber is adjacent to the supply element, and wherein the chamber is able to be impinged with medium through a supply line leading through at least one of a chamber wall of the chamber and through the antenna housing.

4. Antenna according to claim 3, wherein the chamber is lined with a material that absorbs electromagnetic radiation or is formed of a material that absorbs electromagnetic radiation.

5. Antenna according to claim 1, wherein the lens is formed of a porous material in the area between the first lens surface and the second lens surface.

6. Antenna according to claim 1, wherein the lens has channels of porous material.

7. Antenna according to claim 1, wherein the lens has a porous cover layer and wherein the cover layer is provided on a side of the lens facing away from the supply element.

8. Antenna according to claim 1, wherein the porous material has a porosity which prevents clogging of the porous material by a gaseous or liquid flushing medium.

9. Antenna according to claim 1, wherein the porous material has a porosity which prevents clogging of the porous material by a liquid flushing medium.

10. Antenna according to claim 1, wherein the flushing device impinges the lens with a gaseous or liquid flushing medium.

11. Antenna according to claim 1, wherein the flushing device impinges the lens with a liquid flushing medium.

12. Antenna according to claim 1, wherein the supply line of the flushing device supplies the medium in a manner creating excess pressure in the chamber so that the medium escapes from the chamber under a higher pressure.

13. Method for operating an antenna with an antenna housing with at least one supply element and with at least one lens that has at least a first lens surface and a second lens surface, the lens being formed at least in part of a porous material which connects the first lens surface and the second lens surface to one another, comprising the steps of impinging the first lens surface with a medium via the flushing device and causing the medium to pass through the porous material and through the second lens surface as to flush off material on the second lens surface.

14. Method according to claim 13, wherein the impinging of the lens with the medium is carried out continuously.

15. Method according to claim 14, wherein the impinging of the lens with the medium is carried out in a predetermined time interval $\Delta t1$.

16. Method according to claim 13, wherein the impinging of the lens with the medium is carried out with excess pressure during a predetermined time interval $\Delta t2$.

17. Method according to claim 13, wherein the medium is brought to a medium temperature $T1$ before the lens is impinged with the medium.

* * * * *